United States Patent
Chen

(10) Patent No.: US 9,529,149 B2
(45) Date of Patent: Dec. 27, 2016

(54) OPTICAL FIBER MICROWIRE DEVICES AND MANUFACTURE METHOD THEREOF

(71) Applicant: JIANGSU UNIVERSITY, Zhenjiang, Jiangsu (CN)

(72) Inventor: Mingyang Chen, Jiangsu (CN)

(73) Assignee: JIANGSU UNIVERSITY, Zhenjiang, Jiangsu (CN)

(*) Notice: Subject to any disclaimer, the term of this patent is extended or adjusted under 35 U.S.C. 154(b) by 20 days.

(21) Appl. No.: 14/419,115

(22) PCT Filed: Jul. 9, 2014

(86) PCT No.: PCT/CN2014/081892
§ 371 (c)(1),
(2) Date: Feb. 2, 2015

(87) PCT Pub. No.: WO2015/090048
PCT Pub. Date: Jun. 25, 2015

(65) Prior Publication Data
US 2016/0033721 A1      Feb. 4, 2016

(30) Foreign Application Priority Data

Dec. 18, 2013   (CN) .......................... 2013 1 0692542

(51) Int. Cl.
*G02B 6/032*     (2006.01)
*G02B 6/02*      (2006.01)
(Continued)

(52) U.S. Cl.
CPC ........... *G02B 6/02295* (2013.01); *C03B 37/15* (2013.01); *G02B 6/032* (2013.01); *G02B 6/107* (2013.01);
(Continued)

(58) Field of Classification Search
CPC ............ G02B 6/02347; G02B 6/02357; G02B 6/02328; G02B 6/032; B82Y 20/00
(Continued)

(56) References Cited

U.S. PATENT DOCUMENTS

| 6,535,671 B1* | 3/2003 | Poole ................... G02B 6/2852 385/32 |
| 2002/0114574 A1* | 8/2002 | Chandalia .......... G02B 6/02361 385/48 |

OTHER PUBLICATIONS

Gilberto Brambilla et al. "Advances in Optics and Photonics" 2009, Issue 1 vol. 1, pp: 107-161.
(Continued)

*Primary Examiner* — Jennifer Doan
(74) *Attorney, Agent, or Firm* — Novick, Kim & Lee, PLLC; Allen Xue

(57) ABSTRACT

Herein presents an optical fiber microwire device, wherein the device comprising a silica tube, an optical fiber (2) inserted into the silica tube (1) and pigtailed at two sides, wherein the two ends of the silica tube (1) are fused with the optical fiber (2) to form a solid structure, or the two ends of the silica tube (2) are filled with silica rods (3), silica capillaries (4) or segments of optical fibers and fused to form a solid structure. The silica tube (1) together with the optical fiber (2) inside is then tapered to form a micro structure region. Therefore, the micro structure region is consisted of the tapered optical fiber as the microstructure core, tapered silica tube, and the air in between. This invention combine the manufacture of optical fiber microwire and the sealing process, avoiding the disadvantages of the conventional tapered optical fiber microwire, such as fragile mechanical structure, and sensitive to the outer environment variations.

2 Claims, 4 Drawing Sheets

(51) Int. Cl.
*G02B 6/38* (2006.01)
*G02B 6/26* (2006.01)
*C03B 37/15* (2006.01)
*G02B 6/10* (2006.01)
*G02B 6/255* (2006.01)

(52) U.S. Cl.
CPC ............... *G02B 6/264* (2013.01); *G02B 6/385* (2013.01); *C03B 2203/14* (2013.01); *G02B 6/2552* (2013.01)

(58) Field of Classification Search
USPC ..... 385/15, 39, 43, 123, 124, 125, 126, 127, 385/128
See application file for complete search history.

(56) References Cited

OTHER PUBLICATIONS

J. Cascante-Vindas et al. "Supercontinuum generation in highly Ge-doped core Y-shaped microstructured optical fiber" Applied Physics B, Feb. 2010, vol. 98, Issue 2-3, pp. 371-376.

\* cited by examiner

OPTICAL FIBER MICROWIRE DEVICES AND MANUFACTURE METHOD THEREOF

TECHNICAL FIELD

This invention relates to nonlinear optical fiber, in particular high nonlinear optical fiber microwire device.

BACKGROUND OF THE PRESENT INVENTION

Optical fiber microwire devices are well known for their advantages such as strong confinement, large evanescent fields, great configurability, low-loss connection, controllable dispersion, etc. According to the nonlinear coefficient $$\gamma = \frac{2\pi}{\lambda} \frac{n_2}{\pi(\omega^2/4)},$$

wherein $\lambda$ is the wavelength, $\omega$ is the mode field diameter, and $n_2$ is the nonlinear-index coefficient. Obviously, the small mode diameter leads to high nonlinearity. However, simply reducing the diameter of the fiber core of a conventional optical fiber can not achieve small enough mode area. This is owing to the fact that the confinement ability of the fiber cladding with the reduction of core diameter. Increasing the index contrast between the core and the cladding is an efficient way to confine the core modes in a small core. Optical fiber nanowires and microwires can overcome such problem. Optical fiber nanowires and microwires based couplers, high-birefringent optical fiber, and micro resonator have been demonstrated.

Optical fiber nanowires and microwires are generally fabricated by tapering, a segment of optical fiber is tapered to an outer diameter on the order of micrometer or sub micrometer or even smaller. The optical fiber nanowires and microwires is generally surrounded by air, which has low refractive index, whereas the nanowires and microwires have high refractive index. Therefore, the nanowires and microwires has high numerical aperture, as a result, even at small outer diameter, effectively guiding can be achieved. Optical fiber nanowires and microwires have some disadvantages though. For example, the transmission loss will increase with the time if no effective protection to the nanowires and microwires [Adv. Opt. Photon., 2009, 1(1): 107-161]. Therefore, nanowires and microwires should be coated. However, such process will influence the transmission characteristics of the microwires. Also the microwires are sensitive to the outer environment variations.

To overcome such disadvantages, small core optical fiber based on microstructure has been proposed. For example, by using high air-filling fraction cladding and small core size, microstructured optical fiber with high numerical aperature can be achieved, and mode diameter could be as small as 1 µm. Owing to the small core area, to effectively confine light, special fiber configurations are applied. Fore example, the Y-shaped microstructured optical fiber is used to increase the air holes surrounding the fiber core, and reducing the strips surrounding the air holes [Applied Physics B: Lasers and Optics, 2010, 98(2): 371-376]. Even so, the fiber core will still be surrounded by supporting material around the air holes, which will increase the mode area, and deteriorate the confinement ability of the air cladding.

SUMMARY OF THE PRESENT INVENTION

This invention provide a new type of optical fiber microwires with the advantages of simple configuration, suitable for manufacture, feature stable, and high confinement ability.

Herein presents an optical fiber microwire device, wherein the device comprising a silica tube, an optical fiber inserted into the silica tube and pigtailed at two sides, wherein the two ends of the silica tube are fused with the optical fiber to form a solid structure, or the two ends of the silica tube are filled with silica rods, silica capillaries or segments of optical fibers and fused to form a solid structure. The silica tube together with the optical fiber inside is then tapered to form a micro structure region. Therefore, the micro structure region is consisted of the tapered optical fiber as the microstructure core, tapered silica tube, and the air in between.

As an improved design, the optical fiber is tapered to form a pre-tapered region, then it is placed in the silica tube with all the pre-tapered region inside of the silica tube, and after the two ends of the silica tube are fused to form fixed structure, then the silica tube together with the optical fiber inside the silica tube are tapered again. The length of the pre-tapered region of the optical fiber is shorter than the length of the silica tube.

The optical fiber is a single-mode optical fiber, the length of the tapered optical fiber in the microwire device is in the range of 1~100 mm, and the waist diameter of the tapered optical fiber is in the range of 0.01~25 µm.

The outer diameter of the silica tube is in the range of 250~5000 µm, and the thickness of the silica tube is in the range of 20~1000 µm.

The manufacture process of the first kind comprising the following steps:

1. Optical Fiber Handling.

Removing the coating of the center segment of the processing optical fiber, using degreasing cotton dipped with alcohol to clear the surface of the bare fiber. The bare optical fiber can be tapered firstly in order to achieve a microwire with small enough diameter. After the process, the bare fiber should have length 10~100 mm longer than the silica tube, in order to fuse with the silica tube and form fixed structure.

2. Silica Tube Process

The two ends of the silica tube are fused at high temperature, the inner diameter of the two ends will be shrinked to 0.02~0.2 mm larger than the bare optical fiber, and the center of the two ends should still coincide with the cross-section aixs of the silica tube.

3. Silica Tube Sealing

Inserting the prepared optical fiber into the fusing-processed silica tube, and the outside bare fiber at the two ends should be kept with similar lengths. If the optical fiber has been pretapered, then the pretapered region should be placed with equal distance with the two ends of the silica tube.

The two ends of the silica tube together with the optical fiber will be fused again to form a sealed configuration for the optical fiber inside the silica tube. During the fusing process, the silica tube and the optical fiber can be rotated to ensure the optical fiber stay in the center axis of the silica tube. The heating device can be $CO_2$ laser, in this way, reflective mirror can be placed at the opposite position of the $CO_2$ laser to ensure uniform heating of the whole ends. The optical fiber inside the silica tube should keep straight during the whole heating process.

4. Microfiber Formation

Fixing the silica tube at a motor-controlled stage, using an appropriate heating device to fuse and taper the silica tube to a waist of 1/3~1/50 of its original outer diameter, as a result, the optical fiber in the silica tube will also be tapered to 1/3~1/50 of its original diameter. During the tapering process, one end of the optical fiber can launch laser and another end will splice with power meter or spectrometer in order to online detecting the transmission characteristics.

The fixing of the silica tube and optical fiber can also realized by filling. The revised process includes 3 steps.

1. Optical Fiber Handling.

Removing the coating of the center segment of the processing optical fiber, using degreasing cotton dipped with alcohol to clear the surface of the bare fiber. The bare optical fiber can be tapered firstly in order to achieve a microwire with small enough diameter. After the process, the bare fiber should have length 10~100 mm longer than the silica tube, in order to fuse with the silica tube and form fixed structure.

2. Silica Tube Sealing

Inserting the prepared optical fiber into the fusing-processed silica tube, and the outside bare fiber at the two ends should be kept with similar lengths. If the optical fiber has been pretapered, then the pretapered region should be placed with equal distance with the two ends of the silica tube.

Silica capillaries or/and silica rods with lengths of 5~30 mm are filled to the two ends of the silica tube and form fixed structure. Then the two ends of the silica tube together with optical fiber and filled silica rods, silica capillaries in between are fused to form a fixed structure.

During the filling process, the optical fiber should be kept in the center axis of the silica tube. During the fusing process, the silica tube and the optical fiber can be rotated to keep the optical fiber stay in the center axis of the silica tube. The heating device can be $CO_2$ laser, in this way, reflective mirror can be used to ensure uniform heating of the whole ends. The optical fiber inside the silica tube should be straight during the whole heating process.

3. Microfiber Formation

Fixing the silica tube at a motor-controlled stage, using an appropriate heating device to fuse and taper the silica tube to a waist of 1/3~1/50 of its original outer diameter, as a result, the optical fiber in the silica tube will also be tapered to 1/3~1/50 of its original diameter. During the tapering process, one end of the optical fiber can launch laser and another end will splice with power meter or spectrometer in order to online detecting the transmission characteristics.

The pre-tapering of optical fiber is aimed at reducing the outer cladding diameter. Therefore, the tapering of the optical fiber together with the silica tube will lead to quite small microfiber diameter. In addition, tapering ratio at the second time will not need to be high, so that the waist diameter of the tapered silica tube will be kept at a relatively large value. Therefore, it can be fabricated more easily and handling. The pre-tapered optical fiber can also ensure large enough space between the optical fiber and the silica tube, in this way, the tapered silica tube will have little influence on the light transmission characteristics of the microwire.

The silica capillaries at the two ends of the silica tube can be used to inject liquid, solid materials, or gas into the silica tube, in this way, microwire with special cladding can be formed.

This invented microfiber device isolated the microfiber with the outer environment by using silica tube sealed at two ends, avoiding the influence of environment variation. The tapered silica tube has relatively large outer diameter, therefore, it can efficiently protect the microwire. Tapered optical fiber works as the core of the microfiber, the cladding surrounding the microwire is the low-index air in side the silica tube, leading to high index contrast. Silica tube has been kept at long distance from the microwire, avoids its perturbation to the guided modes in the microwire. Such structure can effectively confine the light propagating in the microfiber, leading to high nonlinear and ultra-small mode area operation. During the tapering process, light source, power meter, and spectrometer can be used to detect and accurately control the transmission characteristics of microfiber. This invention combine the manufacture of optical fiber microwire and the sealing process, avoiding the disadvantages of the conventional tapered optical fiber microwire, such as fragile mechanical structure, and sensitive to the outer environment variations.

The microstructured configuration confines the microwire totally with air, ensures high-index contrast. The large space between the microwire and the tube makes the tube has little influence on the transmission characteristics of the guided modes.

DETAILED DESCRIPTION OF THE PRESENT INVENTION

The following Embodiments are based on silica optical fiber and silica material. Other materials such as soft glass, polymer can also be used to form the configurations.

Embodiment 1

Figure 1:
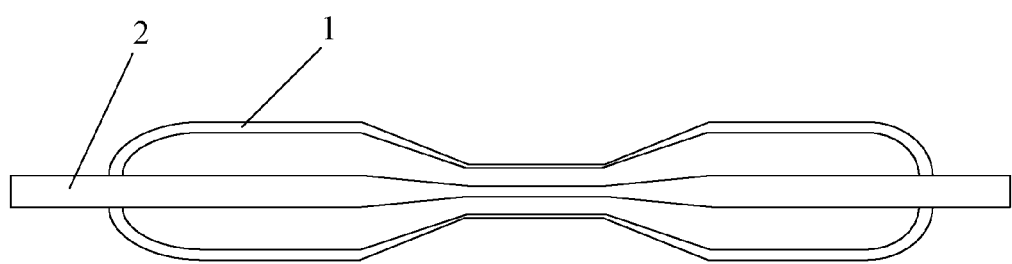
FIG. 1 is a schematic diagram of an example of a microwire device according to the invention, in which the silica tube is sealed with an optical fiber at the two ends.

Single-mode optical fiber 2 with a cladding diameter of 80 μm, and a fiber length of 1 m is used. Optical fiber 2 is uncoated by 120 mm long in the middle segment. The length of silica tube 1 is 90 mm, the inner diameter is 900 μm and the thickness of silica tube 2 is 100 μm. The manufacture process follows the process 1. The optical fiber 2 need not be pre-tapered. The schematic diagram of the microwire device is shown in FIG. 1. The diameter and length of the waist of tapered optical fiber is 6.4 μm and 80 mm, respectively. The waist diameter of the silica tube 1 is 80 μm.

Embodiment 2

Single-mode optical fiber 2 with a cladding diameter of 125 μm, and a fiber length of 1 m is used. Optical fiber 2 is uncoated by 50 mm long in the middle segment. The length of silica tube 1 is 65 mm, the inner diameter is 635 μm and the thickness of silica tube 1 is 265 μm. The manufacture process follows the process 1. The optical fiber need not be pre-tapered. The schematic diagram of the microwire device is shown in FIG. 1. The diameter and length of the waist of tapered optical fiber is 1.25 μm and 40 mm, respectively. The waist diameter of the silica tube 1 is 112 μm.

Embodiment 3

Figure 3:
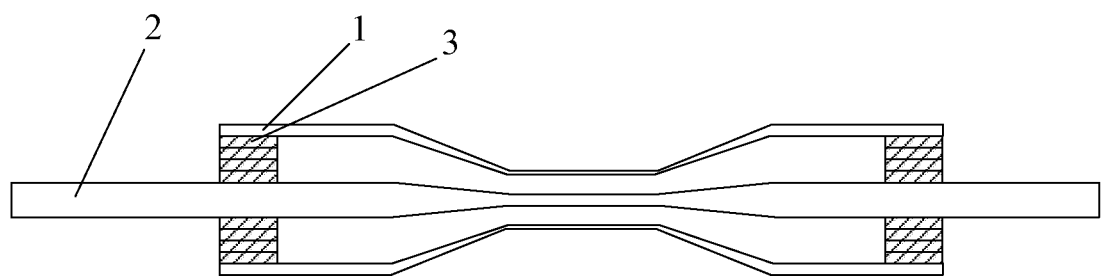
FIG. 3 is a schematic diagram of an example of a microwire according to the invention, in which the two ends of the silica tube is sealed with silica rods.
Figure 4:
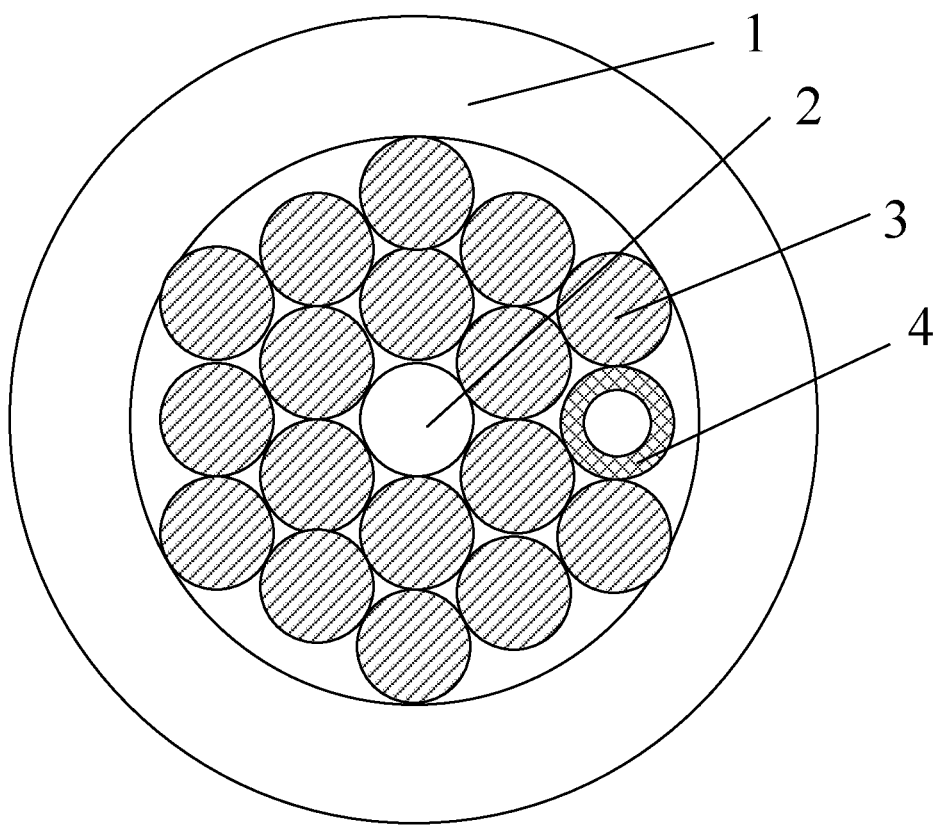
FIG. 4 is the cross-section of the silica tube end, in which the silica tube is sealed with silica rods and silica capillaries.

Single-mode optical fiber 2 with a cladding diameter of 125 μm, and a fiber length of 2 m is used. Optical fiber 2 is uncoated by 60 mm long in the middle segment. Pre-tapering is used to the optical fiber to form a waist diameter of 12 µm, and length of 50 mm. The length of silica tube 1 is 100 mm, and the inner diameter is 380 µm and the thickness of silica tube is 120 µm. The manufacture process follows the process 2. The silica tube 1 is filled with silica rods 3 at the two ends, the cross-section of the silica tube end is shown in FIG. 4. The schematic diagram of the microwire device is shown in FIG. 3. The diameter and length of the waist of tapered optical fiber is 2.4 µm and 60 mm, respectively. The waist diameter of the silica tube 1 is 100 µm.

Embodiment 4

Figure 2:
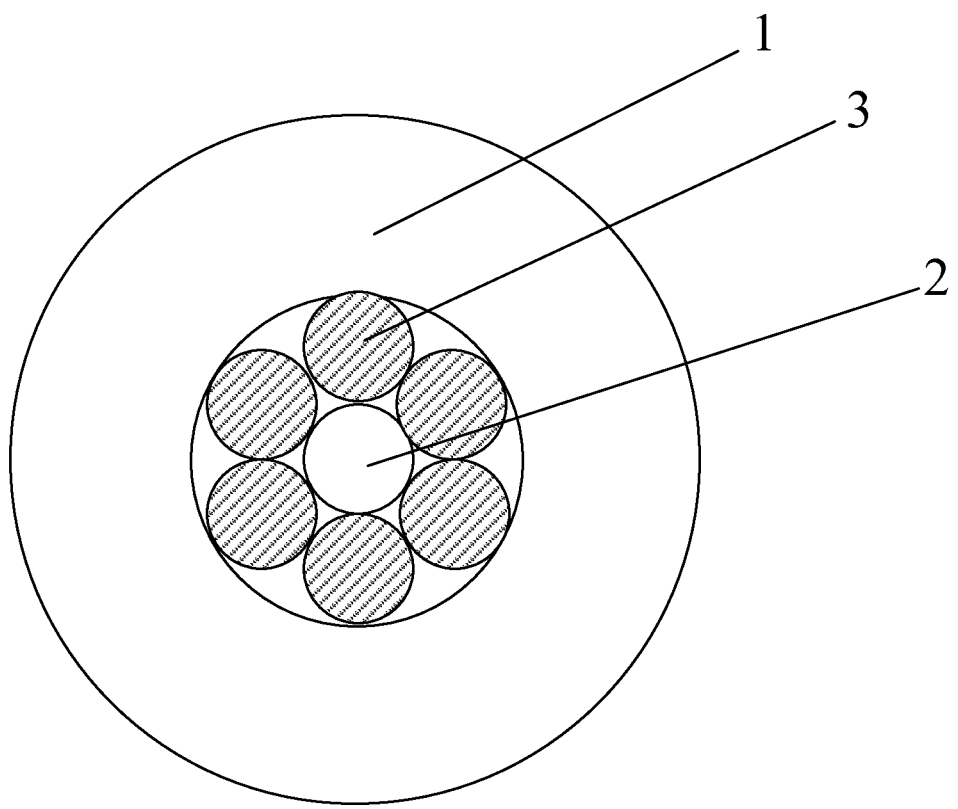
FIG. 2 is the cross-section of the silica tube end, in which the silica tube is sealed with silica rods.

Single-mode optical fiber 2 with a cladding diameter of 125 µm, and a fiber length of 1.5 m is used. Optical fiber 2 is uncoated by 40 mm long in the middle segment. Pretapering is used to the optical fiber 2 to form a waist diameter of 12.5 µm, and length of 40 mm. The length of silica tube 1 is 50 mm, and the inner diameter is 2000 µm and the thickness of silica tube is 500 µm. The manufacture process follows the process 2. The silica tube 1 is filled with silica rods 3 and a silica capillary 4 at the two ends, the cross-section of the silica tube end is shown in FIG. 2. The schematic diagram of the microwire device is shown in FIG. 3. The diameter and length of the waist of tapered optical fiber is 1.25 µm and 40 mm, respectively. The waist diameter of the silica tube 1 is 300 µm.

What is claimed is:

1. A method of making an optical fiber microwire device, comprising:
   1) removing a coating of a center segment of an optical fiber to obtain a bare segment of the optical fiber, cleaning a surface of the bare segment of the optical fiber using a degreasing cotton dipped with alcohol; optionally pretapering the bare segment of the optical fiber to a smaller diameter;
   2) fusing two ends of a silica tube, wherein an inner diameter of the two ends is 0.02 to 0.2 mm larger than the diameter of the segment of bare optical fiber, and a center of each of the two ends of the silica tube coincides with an axis of the silica tube, wherein a length of the bare segment of optical fiber is 10 to 100 mm longer than a length of the silica tube;
   3) inserting the optical fiber obtained from step (1) into the silica tube obtained from step (2) so that two sections of the optical fiber outside of the silica tube are of a similar length, wherein when the optical fiber has been pretapered, the pretapered section is placed within an equal distance from the two ends of the silica tube; fusing the two ends of the silica tube together with the optical fiber to form a sealed configuration having the optical fiber inside the silica tube, wherein during the fusing process, the silica tube and the optical fiber are rotated to ensure the optical fiber stay in the center axis of the silica tube, wherein the heating device for fusing is a CO2 laser, wherein the optical fiber inside the silica tube is kept straight during the whole heating process; and
   4) affixing the silica tube to a motor-controlled stage; fusing and tapering the silica tube so that it has a waist of ⅓ to ⅟₅₀ of original outer diameter of the silica tube, wherein the optical fiber in the silica tube is tapered to ⅓ to ⅟₅₀ of an original diameter of the bare optical fiber, wherein during the tapering process, one end of the optical fiber receives a laser beam and another end splices with power meter or spectrometer in order to detect transmission characteristics.

2. A method of making an optical fiber microwire device, comprising:
   1) removing a coating of a center segment of an optical fiber to obtain a bare segment of the optical fiber, cleaning a surface of the bare segment of the optical fiber using a degreasing cotton dipped with alcohol; optionally pretapering the bare segment of the optical fiber to a smaller diameter;
   2) inserting the optical fiber obtained from step (1) into a fusing-processed silica tube so that two sections of the bare optical fiber outside the silica tube are of a similar length, wherein when the optical fiber has been pretapered, the pretapered section is placed within an equal distance from the two ends of the silica tube; filling both ends of the silica tube with silica capillaries or/and silica rods having a length of 5 to 30 mm; fusing the silica tube having silica capillaries or/and silica rods and the optical fiber inserted therein to form a fixed structure, wherein during the filling process, the optical fiber is kept in the center axis of the silica tube, and the silica tube and the optical fiber are rotated to keep the optical fiber stay in the center axis of the silica tube, wherein a heating device for fusing is a CO2 laser wherein the optical fiber inside the silica tube is kept straight during the whole heating process; and
   3) affixing the silica tube to a motor-controlled stage; fusing and tapering the silica tube so that it has a waist of ⅓ to ⅟₅₀ of original outer diameter of the silica tube, wherein the optical fiber in the silica tube is tapered to ⅓ to ⅟₅₀ of an original diameter of the bare optical fiber, wherein during the tapering process, one end of the optical fiber receives a laser beam and another end splices with power meter or spectrometer in order to detect transmission characteristics.

* * * * *